(12) United States Patent
Tamura et al.

(10) Patent No.: US 10,747,340 B2
(45) Date of Patent: Aug. 18, 2020

(54) TOUCH PAD AND ELECTRONIC APPARATUS

(71) Applicant: LENOVO (SINGAPORE) PTE. LTD., Singapore (SG)

(72) Inventors: Fumio Tamura, Yokohama (JP); Hidetoshi Mori, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/420,001

(22) Filed: May 22, 2019

(65) Prior Publication Data

US 2020/0233507 A1    Jul. 23, 2020

(30) Foreign Application Priority Data

Jan. 21, 2019   (JP) ................................ 2019-007989

(51) Int. Cl.
*G06F 3/0354* (2013.01)
*G06F 3/041* (2006.01)
*G06F 1/16* (2006.01)

(52) U.S. Cl.
CPC .......... *G06F 3/03547* (2013.01); *G06F 1/169* (2013.01); *G06F 3/0416* (2013.01)

(58) Field of Classification Search
CPC .... G06F 3/03547; G06F 3/041; G06F 3/0412; G06F 3/0414–04146
See application file for complete search history.

(56) References Cited

U.S. PATENT DOCUMENTS

| | | | |
|---|---|---|---|
| 10,162,443 B2* | 12/2018 | Lynn | G06F 3/041 |
| 10,180,755 B2* | 1/2019 | Hill | G06F 3/0418 |
| 2010/0097324 A1* | 4/2010 | Anson | G06F 21/36 345/173 |
| 2010/0328052 A1* | 12/2010 | Pasquero | H04M 1/72594 340/407.2 |
| 2017/0357403 A1* | 12/2017 | Geary | G06F 3/0488 |
| 2018/0059806 A1* | 3/2018 | Mori | G06F 3/04842 |
| 2018/0107378 A1* | 4/2018 | Rosenberg | G06F 3/04883 |
| 2018/0314362 A1* | 11/2018 | Kim | G06F 3/044 |
| 2019/0291000 A1* | 9/2019 | Campbell | A63F 13/245 |

FOREIGN PATENT DOCUMENTS

JP    2014-199526 A    10/2014

* cited by examiner

Primary Examiner — Gene W Lee
(74) Attorney, Agent, or Firm — Shimokaji IP

(57) ABSTRACT

A touch pad includes: a center button region; a first button region disposed adjacent to the center button region; a second button region disposed adjacent to the center button region on the opposite side of the first button region; a load sensor configured to detect load at least at the center button region, the first button region and the second button region; and a controller configured to determine a detection by the load sensor of load of a first upper-limit value or higher at least at one of the first and second button regions as a depressed state, and determine a detection by the load sensor of load of a second upper-limit value or higher at the center button region as a depressed state. The second upper-limit value and the first upper-limit value are different. Particularly, the second upper-limit value is larger than the first upper-limit value.

9 Claims, 7 Drawing Sheets

TOUCH PAD AND ELECTRONIC APPARATUS

FIELD OF THE INVENTION

The present invention relates to a touch pad having a button function, the touch pad being configured to suppress an erroneous detection of clicking operation with a center button and left and right buttons and being slim, and relates to an electronic apparatus including such a touch pad.

BACKGROUND OF THE INVENTION

An electronic apparatus, such as a laptop personal computer (laptop PC), includes a touch pad at the palm rest, and this touch pad includes physical click buttons at the upper part or the lower part for clicking operations. Japanese Unexamined Patent Application Publication No. 2014-199526 describes an electronic apparatus including a click button of a capacitance sensor type in a touch pad.

SUMMARY OF THE INVENTION

The physical click button as stated above interferes with slimming of an electronic apparatus, such as a laptop PC. For slimming, some touch pads include a click-button region of a capacitance sensor type that is common to the touch pad as a whole, instead of physical click buttons.

Such a capacitance sensor may cause an erroneous detection such that the sensor erroneously detects a contact with a finger when the tip end of the finger is floating and is not in contact with the click button region.

When the center button region and the left/right button regions are close to each other, the operator may click both of the center button region and the left/right button region at the same time. In this case, the sensor may cause an erroneous detection due to a failure to determine about to one of which button regions the operator intends the clicking operation.

In view of the above, the present invention aims to provide a touch pad having a button function, the touch pad being configured to suppress an erroneous detection of clicking operation with a center button and left and right buttons and being slim, and an electronic apparatus including such a touch pad.

To solve the above-stated problems and achieve the aim, a touch pad according to the first aspect of the present invention includes: a center button region; a first button region disposed adjacent to the center button region; a second button region disposed adjacent to the center button region on the opposite side of the first button region; a load sensor configured to detect load at least at the center button region, the first button region and the second button region; and a controller configured to determine a detection by the load sensor of load of a first upper-limit value or higher at least at one of the first button region and the second button region as a depressed state, and determine a detection by the load sensor of load of a second upper-limit value or higher at the center button region as a depressed state. The second upper-limit value and the first upper-limit value are different.

In the touch pad according to the above-stated aspect, the second upper-limit value may be larger than the first upper-limit value.

Depressing of the first button region may correspond to clicking of a main button of a mouse, depressing of the second button region may correspond to clicking of a sub button of the mouse, and depressing of the center button region may correspond to depressing of a middle button of the mouse.

After the load detected in at least one of the first button region and the second button region reaches the first upper-limit value or more to turn the at least one of the first button region and the second button region to a depressed state, the controller may keep the depressed state until the load decreases to a first lower-limit value or lower, the first lower-limit value being smaller than the first upper-limit value, and after the load detected at the center button region reaches the second upper-limit value or more to turn the center button region to a depressed state, the controller may keep the depressed state until the load decreases to a second lower-limit value or lower, the second lower-limit value being smaller than the second upper-limit value.

A decrease rate of the second lower-limit value to the second upper-limit value may be larger than a decrease rate of the first lower-limit value to the first upper-limit value.

At least one of the first button region, the center button region, and the second button region may have an index including a protrusion close to a boundary of the button regions.

The index in at least one of the first button region and the second button region may have a shape different from a shape of the index at the center button region.

When a maximum load detected in at least one of the first button region and the second button region and a maximum load detected at the center button region are the corresponding upper-limit values or more at the same time, and when positions of the detected maximum loads are away from each other by a predetermined distance or longer, the controller may determine that the button regions are depressed at the same time.

The center button region may have a corner region close to one of the ends along a boundary line with at least one of the first button region and the second button region. When load of the second upper-limit value or higher is detected at the corner region, the controller may determine that the center button region is depressed, and when load of the first upper-limit value or higher is detected at a part of the center button region other than the corner region, the controller may determine that the center button region is depressed.

The center button region may have a corner region close to one of the ends along a boundary line with at least one of the first button region and the second button region. When load of a third upper-limit value or higher, the third upper-limit value being larger than the second upper-limit value, is detected at the corner region, the controller may determine that the center button region is depressed.

Assuming that a direction to place the first button region, the center button region, and the second button region side by side is a first direction, and a direction orthogonal to the first direction on the face of the touch pad is a second direction, the first upper-limit value may have slope characteristics of increasing toward one end in the second direction, and the second upper-limit value may have slope characteristics of increasing toward the other end in the second direction.

An electronic apparatus according to the second aspect of the present invention includes the touch pad according to the first aspect.

The above-described aspects of the present invention provides a touch pad configured to suppress an erroneous detection of clicking operation with a center button and left and right buttons and being slim, and an electronic apparatus including such a touch pad.

DETAILED DESCRIPTION OF THE INVENTION

Referring to the attached drawings, the following describes a touch pad having a mouse button function and an electronic apparatus according to the present invention in details by way of a preferable embodiment.

<Electronic Apparatus>

Figure 1:
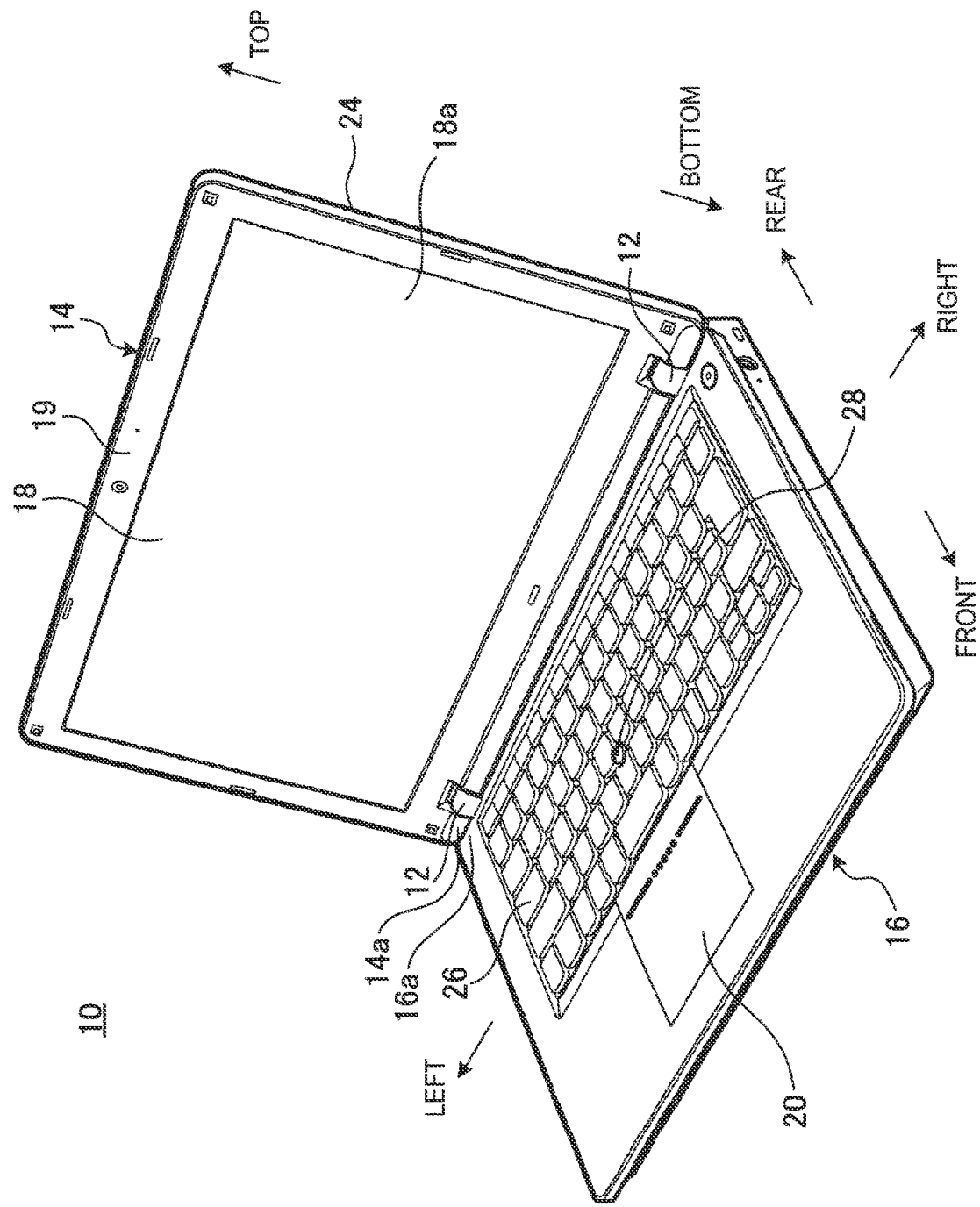
FIG. 1 is a perspective view of an electronic apparatus including a touch pad according to one embodiment of the present invention.

FIG. 1 is a perspective view of an electronic apparatus 10 including a touch pad 20 according to one embodiment of the present invention. FIG. 1 shows the electronic device 10 in the operating mode as a laptop PC, in which a display chassis 14 is open relative to a main body chassis 16 via hinges 12.

The electronic apparatus 10 is a convertible type PC such that the display chassis 14 rotates from the 0-degree position to the 360-degree position. At the 0-degree position, the display chassis 14 is closed relative to the main body chassis 16, and at the 360-degree position, the display chassis 14 rotates behind the main body chassis 16. The electronic apparatus 10 therefore favorably operates as a laptop PC when the display chassis 14 rotates at the angular position of about 90 degrees relative to the main body chassis 16 (see FIG. 1), and favorably operates as a tablet PC when the display chassis 14 rotates at the angular position of 360 degrees relative to the main body chassis 16 to be behind the main body chassis 16. The present embodiment is applicable to such a convertible type PC as well as various types of electronic apparatuses, including a typical laptop PC including a display chassis that is rotatable only to about the 180-degree position, a tablet PC having a display device in one chassis, a mobile phone, a smartphone, and an electronic organizer.

The following describes an electronic apparatus of the present embodiment while referring to a part of the display chassis 14 close to the hinges 12 as bottom (bottom end) and a part on the other side as top (top end) based on the electronic apparatus as a laptop PC shown in FIG. 1 where the display chassis 14 is open at about 90 degrees relative to the main body chassis 16. Similarly the following refers to a part of the main body chassis 16 close to the hinges 12 as rear (rear end) and a part on the other side as front (front end), and refers to the width direction of the display chassis 14 and the main body chassis 16 as left and right.

As shown in FIG. 1, the electronic device 10 includes the display chassis 14 and the main body chassis 16 that are rotatably coupled at the bottom end 14a and at the rear end 16a via a pair of left and right hinges 12.

The display chassis 14 has an inner face, on which a display device 18 is disposed. The display chassis 14 includes a bezel member 19 and a cover member 24 that are overlapped and coupled to be a flat-plate like box that is thinner than the main body chassis 16.

The display device 18 includes a touch-screen type liquid crystal display, for example. The display device 18 is covered with metal or a conductive film at a part other than a display face 18a.

The bezel member 19 is a frame member made of resin. The bezel member 19 covers the outer edge of the display device 18 for holding. The cover member 24 includes a plate member made of resin and a wall standing from the outer edge of the plate member toward the bezel member 19. The cover member 24 covers the lateral faces and the rear face of the display chassis 14. The display chassis 14 couples with the main body chassis 16 via the hinges 12 that are screwed to the cover member 24. The display chassis 14 electrically connects to the main body chassis 16 via a cable (not illustrated) passing through the hinges 12.

The main body chassis 16 is a flat-plate like box and has an inner face, on which a keyboard unit 26 and a touch pad 20 are disposed. The main body chassis 16 internally stores various types of electronic components not illustrated, such as a board, an arithmetic unit and a memory. The keyboard unit 26 may be a software keyboard, for example, to display a virtual keyboard on the touch-screen type liquid crystal display. The keyboard unit 26 includes a trackpoint 28 at the center. The trackpoint 28 is a protruding button enabling an operator to manipulate the cursor without moving the hands from the home position.

<Touch Pad>

Figure 2:
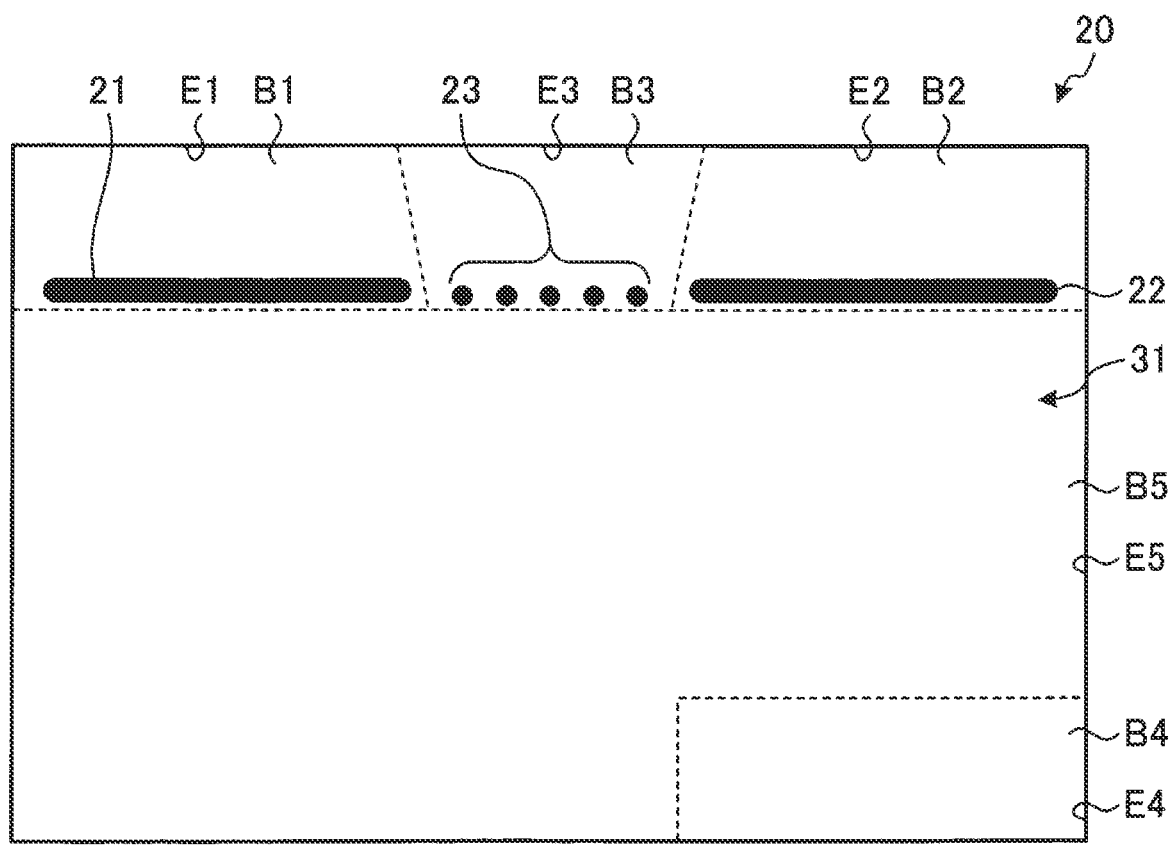
FIG. 2 is a plan view schematically showing the touch pad.

FIG. 2 is a plan view schematically showing the touch pad 20. As shown in FIG. 2, the touch pad 20 has a mouse button function with a button B3 that is a center button (middle button), a button B1 that is a left button (main button) adjacent to the button B3 on the left, and a button B2 that is a right button (sub button) adjacent to the button B3 on the right.

The button B1 has a function, when the operator depresses a region E1 as a first button region, to implement the operations, such as selection, movement, and execution, like the left button of a mouse. The button B2 has a function, when the operator depresses a region E2 as a second button region, to display the available functions at the current cursor position like the right button of a mouse. The button B3 has a function, when the operator depresses a region E3 as a center button region, to scroll the screen in the direction designated with the trackpoint 28. In this way, the buttons B1 to B3 correspond to the mouse buttons.

The touch pad 20 includes a button B4 and a button B5 at the other regions. The button B4 is at a right bottom corner region E4, and has the same function as that of the right button like the button B2. The button B5 at a region E5 is to implement drag-and-release, various gesture operations, and clicking operations. In this way, the touch pad 20 has the five buttons B1 to B5. The operations assigned to these buttons B1 to B5 are not limited to those described above, and various types of functions may be assigned to these buttons. A lot of types of functions may be assigned to these buttons in combination with the key depression of the keyboard unit 26.

On the entire face of the touch pad 20, a tri-axial (X, Y, Z directions) load sensor 31 is disposed. The load sensor 31 reads a change of the contact resistance between the upper part and the lower part during depression to detect the intensity of pressure. In one example, the load sensor 31 is a strain-gauge sensor, which may be other types of sensors, such as a piezoelectric type sensor. The load sensor 31 may be disposed only at the regions E1 to E3 corresponding to the mouse buttons, and a capacitance sensor as another type of touch sensor may be disposed at the regions other than the regions E1 to E3. In another sensor layout, a simple load sensor to detect the load in the Z direction only and a capacitance sensor to detect the position in the X- and Y-directions may be overlapped on the entire face of the touch pad 20.

The touch pad includes indexes 21 and 22 in the form of protrusions at parts close to the front ends of the regions E1 and E2 on the faces. The operator senses the boundary of the region E1 or E2 by touching the index 21 or 22. The touch pad also includes an index 23 in the form of a protrusion at a part close to the front end of the region E3 on the face. The operator senses the boundary of the region E3 by touching the index 23. The indexes 21 and 22 are printed linear bars, and the index 23 includes a plurality of printed dots arranged laterally. In this way, at least one of the indexes 21 and 22 has a different shape from that of the index 23. Note here that there is no need to dispose each of the indexes 21 to 23 at the corresponding region E1 to E3, and any one of the indexes may be disposed at the corresponding region.

In this embodiment, the buttons B1 to B3 are disposed closer to the rear end of the touch pad 20. In another embodiment, these buttons may be disposed closer to the front end.

<Touch Detection Operation>

Figure 3:
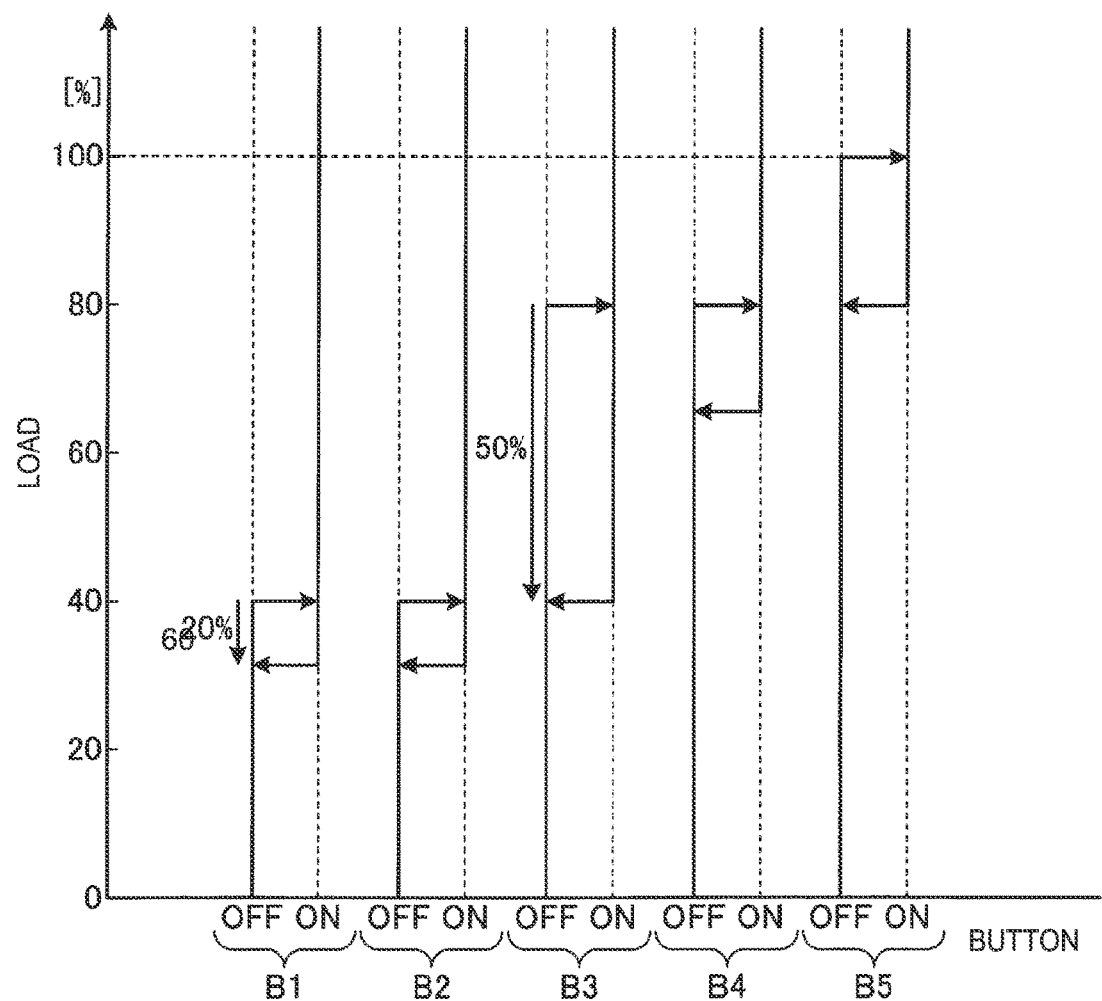
FIG. 3 describes on-off settings of touching versus the load applied to the buttons.

FIG. 3 describes on-off settings of the touching versus the load applied to these buttons B1 to B5. The values of the load in FIG. 3 are normalized values while setting the upper limit to turn the button B5 on as 100%.

As shown in FIG. 3, when the detected load at the buttons B1 and B2 is 40% or more, these buttons are detected as ON (depressed state). When the detected load after that is 32% or less, these buttons are detected as OFF. When the detected load at the button B3 is 80% or more, the button is detected as ON. When the detected load after that is 40% or less, the button is detected as OFF. When the detected load at the button B4 is 80% or more, the button is detected as ON. When the detected load after that is 66% or less, the button is detected as OFF. When the detected load at the button B5 is 100% or more, the button is detected as ON. When the detected load after that is 80% or less, the button is detected as OFF.

In this way, the upper-limit value of the load for the button B3 is set different from the upper-limit value of the load for the buttons B1 and B2. Specifically, the upper-limit value of the load for the button B3 is set larger than the upper-limit value of the load for the buttons B1 and B2. This distinguishes the touch at the buttons B1 and B2 from the touch at the button B3. For instance, when the user intends to touch the button B1, they may touch the button B3 as well. In this case, the touch panel is configured to detect the touch at the button B1 firstly because the upper-limit value for the button B1 is smaller than the upper-limit value for the button B3. This ignores an erroneous touch at the button B3.

When the maximum load detected in at least one of the regions E1 and E2 is the upper limit or higher, and the maximum load detected at the region E3 also is the upper limit or higher at the same time, this case is determined as the depression of the button B1 or B2 and the button B3 at the same time if the positions of the maximum load in these regions are away from each other by a predetermined distance or longer. When the positions of the maximum load are not away from each other by the predetermined distance or longer, it may be determined that the region having a larger maximum load is depressed.

The buttons B1 to B5 have a hysteresis property so that detection of the load of the upper-limit value or higher shifts the button to turn ON, and detection of the load of the lower-limit value or lower after that shifts the button to turn OFF. This stabilizes the ON-state determination of these buttons B1 to B5.

While a decrease rate of the lower-limit values to the upper-limit values of the buttons B1, B2, B4 and B5 are 20%, a decrease rate of the lower-limit value to the upper-limit value of the button B3 is set larger as 50%. This is because the operator has to keep depressing the button B3 during a screen scrolling operation with the button B3 and the trackpoint 28, and the upper-limit value for the button B3 is large, the load applied to the button B3 by the operator therefore easily decreases during the operation. The decrease rate for the button B3 is therefore set larger for easy keeping of the ON state to improve the stability of the operation to keep the ON state.

The upper-limit values of the load for the buttons B4 and B5 are set large to avoid an erroneous operation during the manipulation.

<Control System of Touch Pad>

Figure 4:
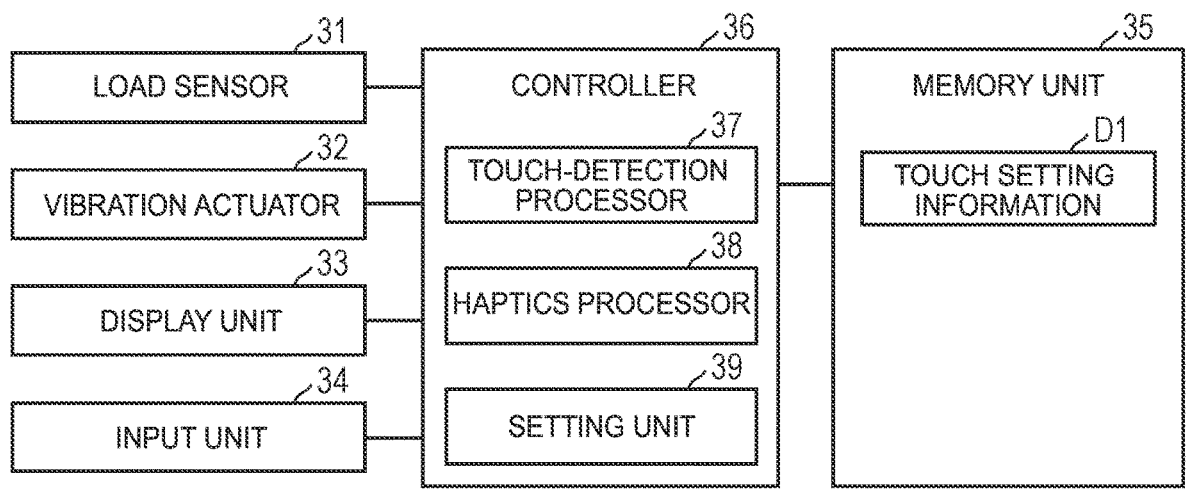
FIG. 4 is a block diagram of a control system of the touch pad.

FIG. 4 is a block diagram of a control system of the touch pad 20. As shown in FIG. 4, the touch pad 20 includes the load sensor 31, a vibration actuator 32, a display unit 33, an input unit 34, a memory unit 35, and a controller 36. The descriptions on the above-stated load sensor 31 are omitted. The vibration actuator 32 is disposed on the rear face of the load sensor 31, and implements haptics so as to generate haptic vibrations when the touch turns ON or the touch turns OFF. The display unit 33 includes the display device 18. The input unit 34 includes various types of input devices, including the touch pad 20 and the keyboard unit 26.

The memory unit 35 is a memory device including a hard disk device and a non-volatile memory, and stores touch-setting information D1.

The controller 36 controls the electronic apparatus 10 as a whole, and includes a touch-detection processor 37, a haptics processor 38 and a setting unit 39. The controller 36 stores programs corresponding to the functions of the touch-detection processor 37, the haptics processor 38, and the setting unit 39 in storage devices, such as a non-volatile memory and a magnetic disk device, and loads these programs to the memory for execution by the CPU so as to execute the process corresponding to these units.

The touch-detection processor 37 performs the touch-detection processing as stated above based on touch-setting information D1 on the buttons B1 to B5. When the load is the upper-limit value or more to turn ON and the load is the lower-limit value or less to turn OFF, the haptics processor 38 gives haptic vibrations via the vibration actuator 32. The setting unit 39 stores the setting information on the buttons B1 to B5 as the touch-setting information D1.

<Touch Detection Processing>

Figure 5:
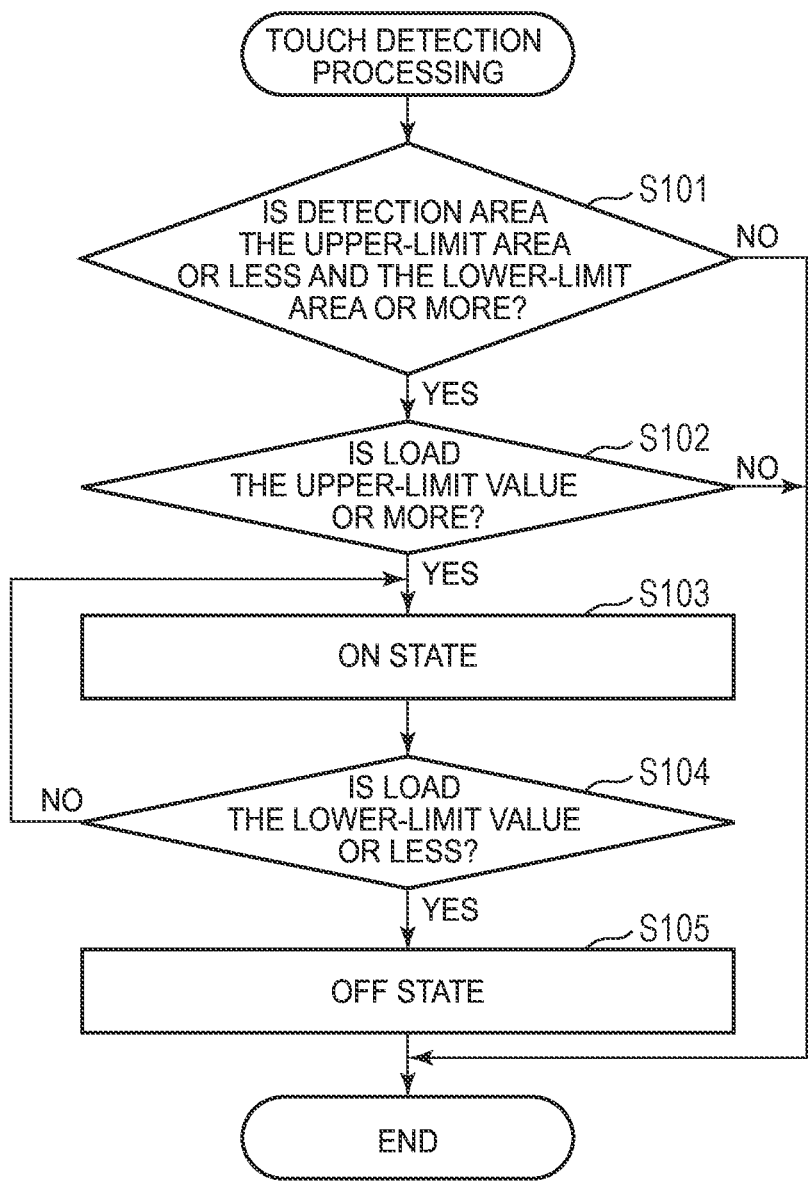
FIG. 5 is a flowchart showing the procedure of the touch detection processing by a touch-detection processor.

Referring next to the flowchart of FIG. 5, the following describes the procedure of the touch detection processing by the touch-detection processor 37. Firstly the touch-detection processor 37 determines whether the detection area of the detected load is the upper-limit area or less and the lower-limit area or more (Step S101). Such a determination on the detection area about the upper-limit area or less and the lower-limit area or more is to determine whether the detection area shows the touched area with a finger of the operator or not. When the detection area exceeds the upper-limit area, this means that the area exceeds the touched area with a finger, and the touch-detection processor determines this as an erroneous operation. When the detection area is less than the lower-limit area, this means that the depression with a finger is insufficient. The touch-detection processor therefore determines that the operator does not intend a touch operation. When the detection area of the detected load is not the upper-limit area or less and the lower-limit area or more (No at Step S101), this processing ends.

When the detection area of the detected load is the upper-limit area or less and the lower-limit area or more (Yes at Step S101), the touch-detection processor determines whether the load is the upper-limit value or more or not (Step S102). When the load is not the upper-limit value or more (No at Step S102), this processing ends.

When the load is the upper-limit value or more (Yes at Step S102), the touch-detection processor determines the current touching state as ON (Step S103). After that, the touch-detection processor determines whether the load is the lower-limit value or less or not (Step S104). When the load is not the lower-limit value or less (No at Step S104), the procedure shifts to Step S103 to keep the ON state.

When the load is the lower-limit value or less (Yes at Step S104), the touch-detection processor determines the current touch operation as OFF (Step S105), and ends this processing. The touch-detection processor repeatedly performs the above-stated processing every predetermined time duration.

MODIFICATION EXAMPLE 1

The above-stated embodiment sets the upper-limit value of the load for each of the regions E1 to E5 of the buttons B1 to B5 in the touch pad 20. Modification Example 1 sets the upper-limit value of the load for a partial region in the button B3.

Figure 6:
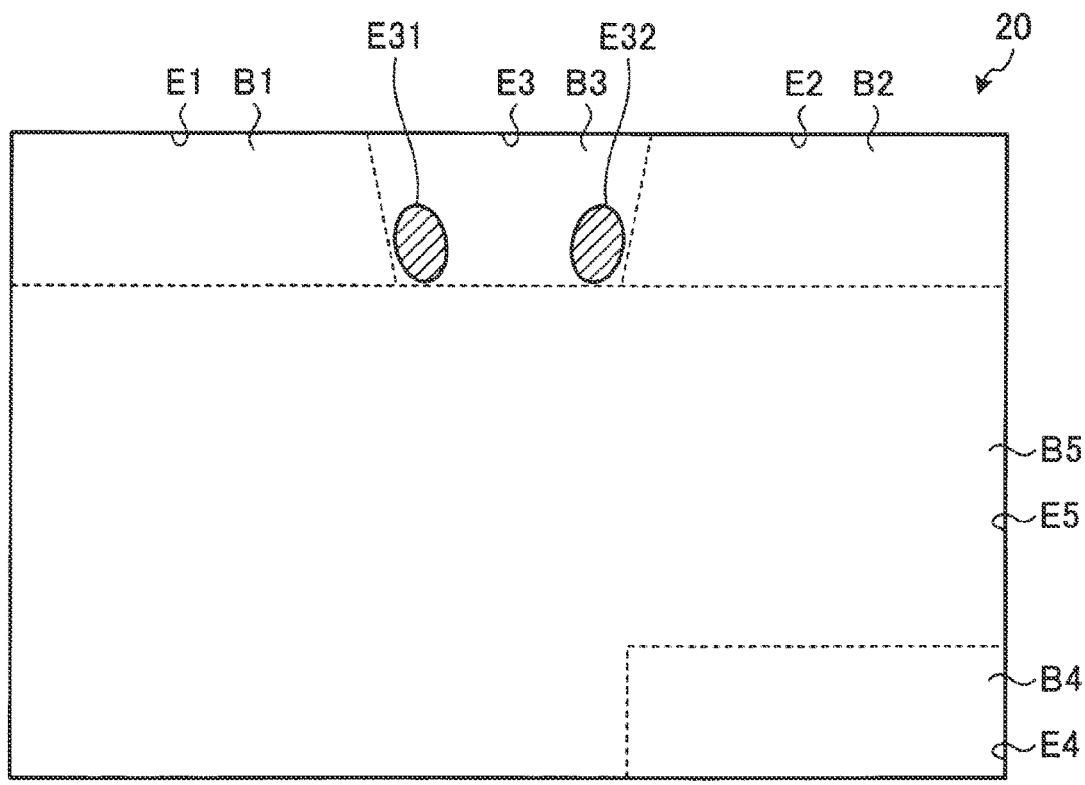
FIG. 6 is a plan view schematically showing a touch pad according to Modification Example 1.

FIG. 6 is a plan view schematically showing the touch pad 20 according to Modification Example 1. As shown in FIG. 6, Modification Example 1 includes regions E31 and E32 in the region E3 at corner regions close to one edge of the boundary lines with the regions E1 and E2. Specifically the same upper-limit value (80%) as that for the region E3 in FIG. 2 is set for the region E31 at the left front part and the region E32 at the right front part of the region E3 of the button B3, and the same upper-limit value (40%) as that for the regions E1 and E2 is set for the part other than the regions E31 and E32 of the region E3. Here, the present embodiment may include at least one of the regions E31 and E32.

When depressing the button B3 with the thumbs, the operator often depresses the parts of these regions E31 and E32 with the thumbs while placing the hands at the home position of the keyboard unit 26. The same setting only at these regions E31 and E32 as that at the region E3 in FIG. 2 achieves the same advantageous effects as those from the above-stated embodiment.

The upper-limit value of the load at the regions E31 and E32 may be set larger than the upper-limit value for the region E3 of FIG. 2, and the upper-limit value of the part other than the regions E31 and E32 of the region E3 may be the same value as the upper-limit value set for the region E3 of FIG. 2.

MODIFICATION EXAMPLE 2

The above-stated embodiment sets the upper-limit value of the load for each of the regions E1 to E5 of the buttons B1 to B5 of the touch pad 20 that is constant over the surface. Modification Example 2 sets the upper-limit value for the regions E1 and E2 to have slope characteristics such that the upper-limit value increases toward one of the ends, e.g., toward the front end, in the Y direction (second direction) orthogonal to the X direction (first direction) to place the regions E1, E3 and E2 side by side, and sets the upper-limit value for the region E3 to have slope characteristics such that the upper-limit value increases toward the rear end that is the other end in the second direction.

Figure 7:
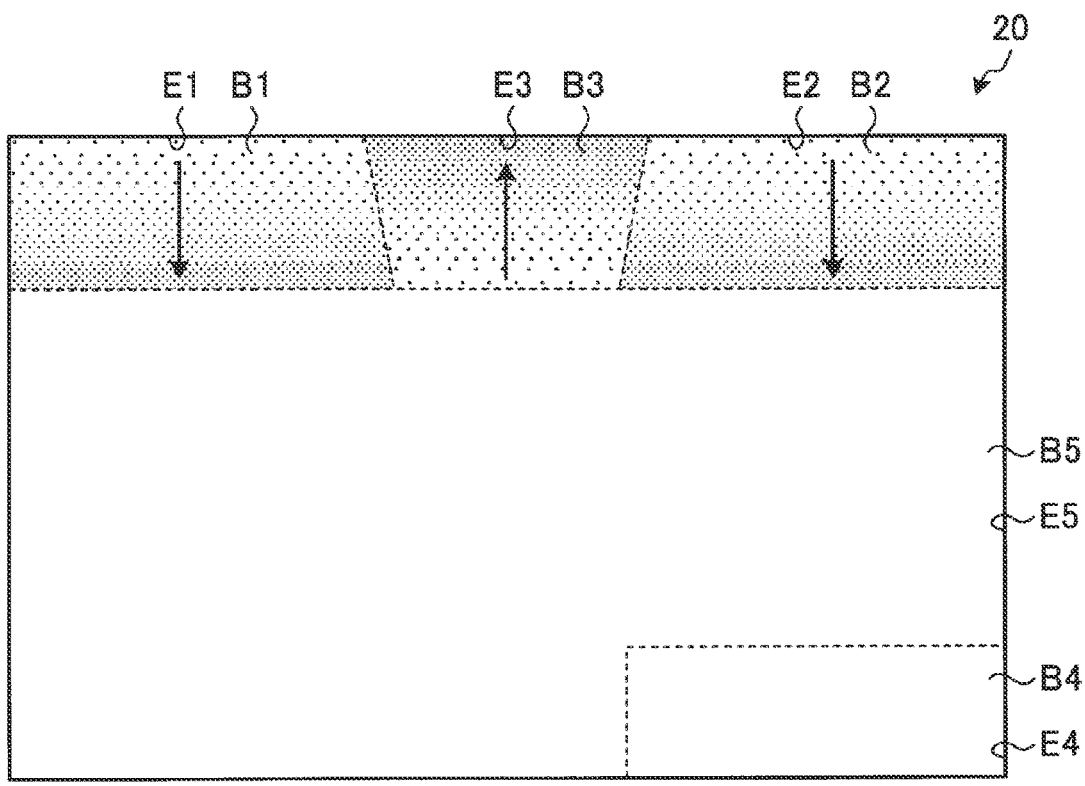
FIG. 7 is a plan view schematically showing a touch pad according to Modification Example 2.

FIG. 7 is a plan view schematically showing the touch pad 20 according to Modification Example 2. As shown in FIG. 7, Modification Example 2 sets the upper-limit value of the load for the regions E1 and E2 so that the upper-limit value increases toward the front, and sets the upper-limit value of the load for the region E3 so that the upper-limit value increases toward the rear.

Such slope characteristics of the upper-limit values are to turn the buttons B1 to B3 ON with the same haptic load as that of physical buttons having slopes. When the operator replaces physical buttons with the buttons B1 to B3, they are allowed to smoothly get comfortable to the operation with the buttons B1 to B3 because their maneuvering feeling is similar. FIG. 7 assumes the physical buttons that include a physical button corresponding to the button B3 that has a slope ascending toward the rear and physical buttons corresponding to the buttons B1 and B2 that have a slope ascending toward the front, and sets such slope characteristics of the upper-limit values. In this way Modification Example 2 achieves the slope characteristics of the upper-limit values that correspond to the slopes of the familiar physical buttons for the operator.

MODIFICATION EXAMPLE 3

The above-stated embodiment includes the indexes 21 to 23 at parts close to the front ends in the regions E1 to E3 of the buttons B1 to B3. Modification Example 3 includes indexes 121 to 123 so that the entire regions rise at parts other than around the boundary lines of the regions E1 to E3.

Figure 8:
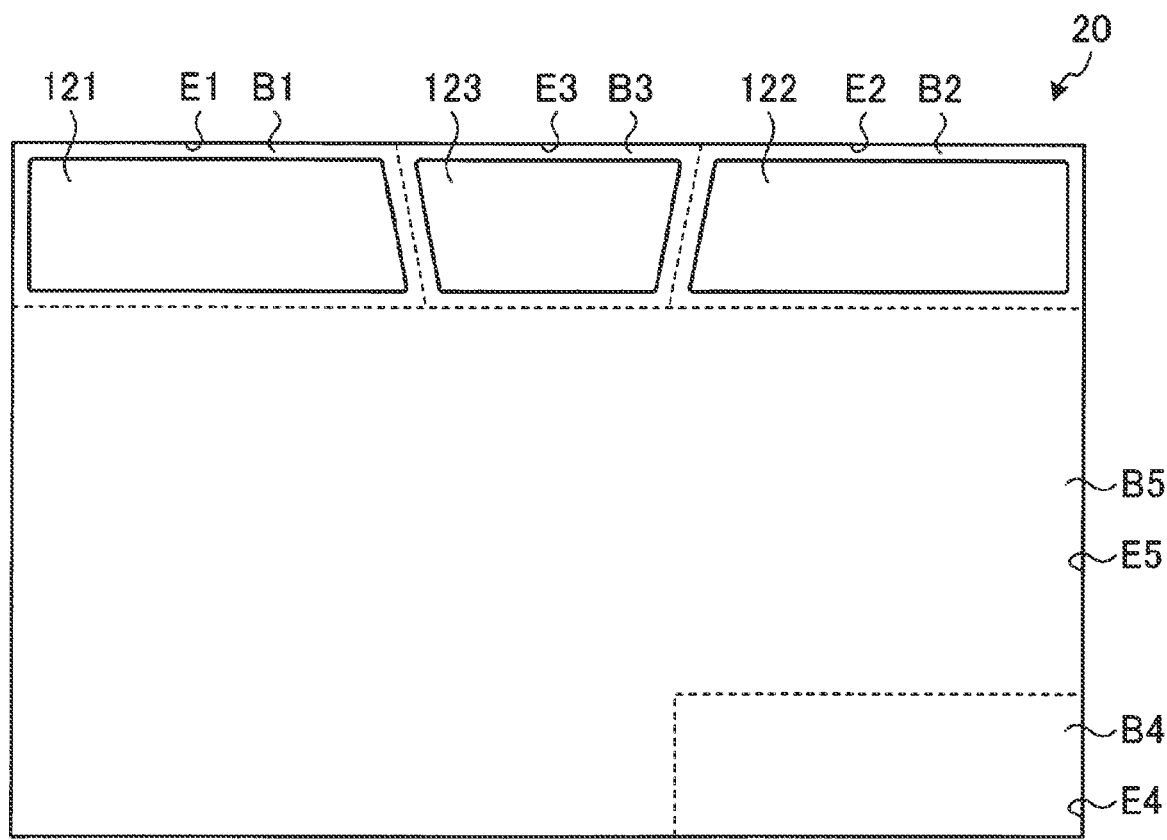
FIG. 8 is a plan view schematically showing a touch pad according to Modification Example 3.
Figure 9A:
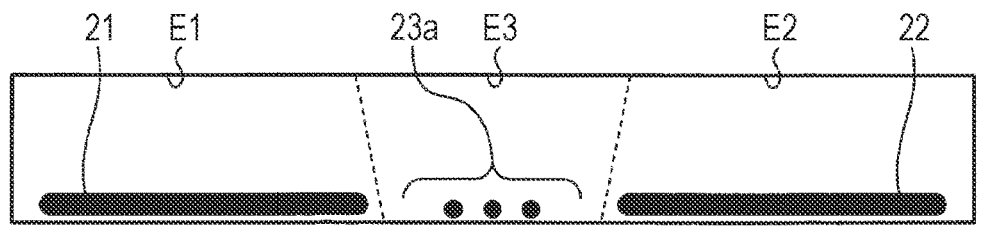
FIGS. 9A-E shows examples of the indexes of the buttons according to Modification Example 4.
Figure 9B:
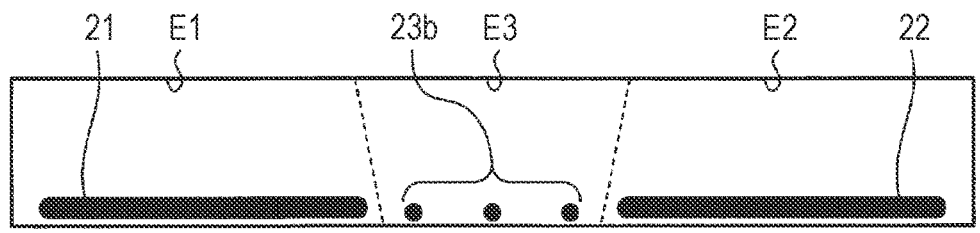
Figure 9C:
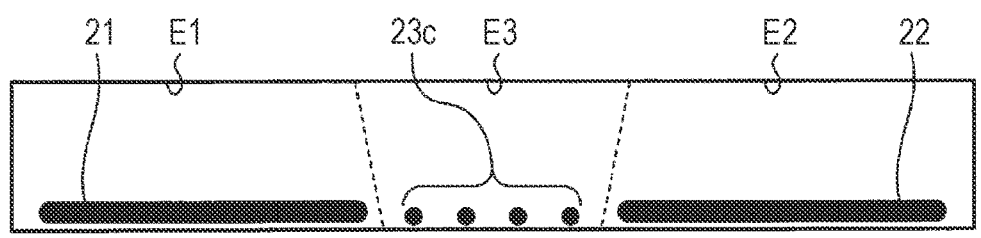
Figure 9D:
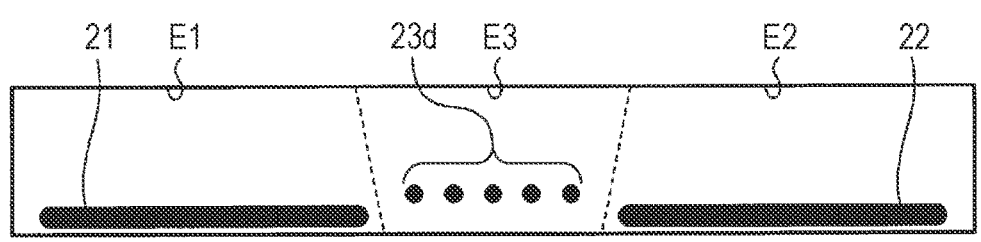
Figure 9E:
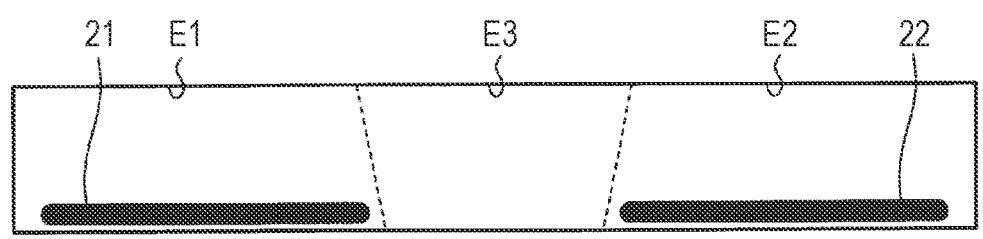

FIG. 8 is a plan view schematically showing the touch pad 20 according to Modification Example 3. As shown in FIG. 8, Modification Example 3 disposes the protruding indexes 121 to 123 made of thin-plate like members, such as tape, having a small shape inward from the boundary lines of the regions E1 to E3 by a predetermined width. The sides of the upper face of each of the indexes 121 to 123 function as the index.

Instead of these indexes 121 to 123, the outer edge of each index 121 to 123 only may protrude, or the outer edge of each index 121 to 123 may include discretely disposed protrusions. The surface of the indexes 121 to 123 may be embossed, and preferably the embossing is different between the buttons B1 and B2 and the button B3. Instead of the embossing at these indexes 121 to 123, indexes by protrusions or embossing may be integrally formed on the cover surface of the load sensor 31.

MODIFICATION EXAMPLE 4

FIG. 9 shows examples of the indexes on the buttons B1 to B3 according to Modification Example 4. As shown in FIG. 9, FIG. 9A shows densely-disposed three dots instead of the indexes 23 shown in FIG. 2. FIG. 9B shows evenly-disposed three dots instead of the indexes 23 shown in FIG. 2. FIG. 9C shows evenly-disposed four dots instead of the indexes 23 shown in FIG. 2. FIG. 9D shows five dot indexes 23*d* that are shifted to the rear from the indexes 23 shown in FIG. 2. The example of FIG. 9E does not include the indexes 23 shown in FIG. 2. The indexes 21 to 23 and 23*a* to 23*d* may change the height generally, or these indexes may have different heights.

The above embodiment and modified examples schematically illustrate the configurations about their functions in the drawings, and do not necessarily have to be configured physically as illustrated. That is, the form of distribution and integration of the devices and the components is not limited to the illustrated one, and all or a part thereof may be functionally or physically distributed or integrated in any units according to various usage conditions.

The invention claimed is:

1. A touch pad comprising:
a center button region;
a first button region disposed adjacent to the center button region;
a second button region disposed adjacent to the center button region and on an opposite side of the first button region;
a load sensor configured to detect load at least in the center button region, the first button region and the second button region; and
a controller configured to determine a detection by the load sensor of load of a first upper-limit value or higher at least in one of the first button region and the second button region as a depressed state, and determine a detection by the load sensor of load of a second upper-limit value or higher at a corner region of the center button region as a depressed state,
wherein the second upper-limit value is larger than the first upper-limit value;
wherein the center button region has the corner region close to a boundary line of at least one of the first button region and the second button region, and
when load of the second upper-limit value or higher is detected at the corner region, the controller determines that the center button region is depressed, and when load of the first upper-limit value or higher is detected at a part of the center button region other than the corner region, the controller determines that the center button region is depressed.

2. The touch pad according to claim 1, wherein depressing of the first button region corresponds to clicking of a main button of a mouse, depressing of the second button region corresponds to clicking of a sub button of the mouse, and depressing of the center button region corresponds to depressing of a middle button of the mouse.

3. The touch pad according to claim 1, wherein after the load detected in at least one of the first button region and the second button region reaches the first upper-limit value or more, to turn the at least one of the first button region and the second button region to a depressed state, the controller keeps the depressed state until the load decreases to a first lower-limit value or lower, the first lower-limit value being smaller than the first upper-limit value, and after the load detected at the center button region reaches the second upper-limit value or more, to turn the center button region to a depressed state, the controller keeps the depressed state until the load decreases to a second lower-limit value or lower, the second lower-limit value being smaller than the second upper-limit value.

4. The touch pad according to claim 3, wherein a decrease rate of the second lower-limit value to the second upper-limit value is larger than a decrease rate of the first lower-limit value to the first upper-limit value.

5. The touch pad according to claim 1, wherein at least one of the first button region, the center button region, and the second button region has an index including a protrusion close to a boundary of the button regions.

6. The touch pad according to claim 5, wherein the index in at least one of the first button region and the second button region has a shape different from a shape of the index at the center button region.

7. The touch pad according to claim 1, wherein when a maximum load detected in at least one of the first button region and the second button region, and a maximum load detected at the center button region, are the corresponding upper-limit values or more at the same time, and when positions of the detected maximum loads are away from each other by a predetermined distance or more, the controller determines that the button regions are depressed at the same time.

8. A touch pad comprising:
a center button region;
a first button region disposed adjacent to the center button region;
a second button region disposed adjacent to the center button region and on an opposite side of the first button region;
a load sensor configured to detect load at least in the center button region, the first button region and the second button region; and
a controller configured to determine a detection by the load sensor of load of a first upper-limit value or higher at least in one of the first button region and the second button region as a depressed state, and determine a detection by the load sensor of load of a second upper-limit value or higher at a part of the center button region other than a corner region as a depressed state,
wherein the second upper-limit value is larger than the first upper-limit value;
wherein the center button region has the corner region close to a boundary line of at least one of the first button region and the second button region, and
when load of a third upper-limit value or higher, the third upper-limit value being larger than the second upper-limit value, is detected at the corner region, the controller determines that the center button region is depressed.

9. A touch pad comprising:
a center button region;
a first button region disposed adjacent to the center button region;
a second button region disposed adjacent to the center button region and on an opposite side of the first button region;
a load sensor configured to detect load at least in the center button region, the first button region and the second button region; and
a controller configured to determine a detection by the load sensor of load of a first upper-limit value or higher at least in one of the first button region and the second button region as a depressed state, and determine a detection by the load sensor of load of a second upper-limit value or higher at the center button region as a depressed state,
wherein a direction to place the first button region, the center button region, and the second button region side by side is a first direction, and a direction orthogonal to the first direction on the face of the touch pad is a second direction, the first upper-limit value has slope characteristics of increasing toward one end in the second direction, and the second upper-limit value has slope characteristics of increasing toward the other end in the second direction.

* * * * *